United States Patent
Kang et al.

(10) Patent No.: US 8,926,116 B2
(45) Date of Patent: Jan. 6, 2015

(54) DISPLAY DEVICE

(71) Applicant: Samsung Display Co., Ltd., Yongin (KR)

(72) Inventors: Sung Yong Kang, Asan-si (KR); Taek-Sun Shin, Hwaseong-si (KR); In Sun Hwang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/733,751

(22) Filed: Jan. 3, 2013

(65) Prior Publication Data

US 2014/0056025 A1    Feb. 27, 2014

(30) Foreign Application Priority Data

Aug. 22, 2012 (KR) .................. 10-2012-0091801

(51) Int. Cl.
*G09F 13/04* (2006.01)
*F21V 8/00* (2006.01)

(52) U.S. Cl.
CPC ............ *G02B 6/0066* (2013.01); *G02B 6/0073* (2013.01)
USPC ........................................ 362/97.3; 362/609

(58) Field of Classification Search
USPC ................................. 362/609, 97.3
See application file for complete search history.

(56) References Cited

U.S. PATENT DOCUMENTS

| | | | |
|---|---|---|---|
| 8,023,070 | B2 | 9/2011 | Toyama et al. |
| 8,077,273 | B2 | 12/2011 | Mishima et al. |
| 2007/0183149 | A1* | 8/2007 | Ko et al. .................. 362/225 |
| 2007/0211184 | A1 | 9/2007 | Erchak et al. |
| 2010/0053504 | A1 | 3/2010 | Kim et al. |
| 2011/0007242 | A1 | 1/2011 | Lee et al. |
| 2011/0032450 | A1 | 2/2011 | Shigeta et al. |
| 2011/0234938 | A1 | 9/2011 | Jeong |

FOREIGN PATENT DOCUMENTS

| | | |
|---|---|---|
| JP | 4020397 | 10/2007 |
| JP | 2010-128498 | 6/2010 |
| KR | 10-2008-0052707 | 6/2008 |
| KR | 10-2008-0097699 | 11/2008 |
| KR | 10-2011-0031009 | 3/2011 |
| KR | 10-2011-0039092 | 4/2011 |

OTHER PUBLICATIONS

English Translation of KR 10-2008-0052707, published Jun. 12, 2008.*

* cited by examiner

*Primary Examiner* — Mary Ellen Bowman
(74) *Attorney, Agent, or Firm* — Innovation Counsel LLP

(57) ABSTRACT

A display device includes a display panel. The display device further includes a light source attached to a surface of the display panel. The display device further includes a light guide overlapping the display panel.

20 Claims, 5 Drawing Sheets

DISPLAY DEVICE

This application claims priority to and the benefit of Korean Patent Application No. 10-2012-0091801 filed in the Korean Intellectual Property Office on Aug. 22, 2012, the entire contents of which are incorporated herein by reference.

BACKGROUND (a) Field

The present invention relates to a display device. More particularly, the present invention relates to a display device that includes a light source.

(b) Description of the Related Art

A display device is typically required for each of a computer monitor, a television, a mobile phone, etc. For example, the display device may be a cathode ray tube display device, a liquid crystal display device, or a plasma display device.

The liquid crystal display device, which is one of the most common types of flat panel displays currently in use, generally includes a liquid crystal display panel that may include field generating electrodes (such as a pixel electrode and a common electrode) and a liquid crystal layer interposed therebetween. The liquid crystal display device may generate an electric field in the liquid crystal layer by applying voltages to the field generating electrodes. The liquid crystal display device may determine orientations of liquid crystal molecules of the liquid crystal layer by controlling the generated electric field, thereby controlling polarization of incident light so as to display images.

Since the liquid crystal display panel is not a self-luminous element, the liquid crystal display device typically needs a light source that provides light to the liquid crystal layer. The light source may be a separately mounted artificial light source or a natural light source (e.g., the sun). For example, the artificial light source used in the liquid crystal display device may include a light emitting diode (LED), a cold cathode fluorescent lamp (CCFL), or an external electrode fluorescent lamp (EEFL).

The artificial light source is typically separated (and spaced) from the display panel such that a substantially large thickness of the display device may be required. Conventionally, the light source is mounted on a circuit board that is separate from the display panel, and a connection means for the light source to receive a signal from an external device is provided on the circuit board. The conventional structure associated with the light source may require a complicated assembly process, and connection defects may occur in the assembly process.

The above information disclosed in this Background section is only for enhancement of understanding of the background of the invention. The Background section may contain information that does not form the prior art that is already known in this country to a person of ordinary skill in the art.

SUMMARY

One or more embodiments of the invention may be related to a display device that includes a display panel. The display device may further include a light source that is attached to a surface of the display panel. The display device may further include a light guide that overlaps the display panel.

In one or more embodiments, the display panel may include a first substrate and a second substrate overlapping each other. The light source may be attached to a first surface of the first substrate, wherein the first surface of the first substrate may be substantially parallel to a first surface of the light guide.

In one or more embodiments, the light source may face a second surface of the light guide, wherein the second surface of the light guide may not be parallel to the first surface of the first substrate. The light source may be configured to irradiate light on the second surface of the light guide.

In one or more embodiments, the display device may include the following elements: a printed circuit board, a light source driver disposed on the printed circuit board and configured for generating a signal to control the light source, and a connection film connecting the printed circuit board (PCB) and the display panel.

In one or more embodiments, the display device may include a first wiring member connecting the light source driver and the connection film. The display device may further include a second wiring member connecting the connection film and the light source.

In one or more embodiments, a first portion the connection film may be attached to the printed circuit board through the first wiring member. A second portion of the connection film may be attached to a second surface of the first substrate through the second wiring member. A portion of the first substrate may be disposed between a first portion of the second wiring member and a second portion of the second wiring member.

In one or more embodiments, the connection film may include at least one of a flexible printed circuit structure and a chip-on-film structure.

In one or more embodiments, the light source may include at least one of a light emitting diode chip and a light emitting diode package.

In one or more embodiments, the display panel may include a display area and a non-display area. The light source may be disposed at the non-display area.

In one or more embodiments, the display device may include an optical sheet disposed between the light guide and the display panel. The display device may further include a reflector. The light guide may be disposed between the optical sheet and the reflector.

In one or more embodiments, the light source may be disposed between the reflector and the display panel.

In one or more embodiments, a portion of the reflector may extend beyond the light guide. The light source may be disposed between the display panel and the portion of the reflector.

In one or more embodiments, the display device may include a first light source pad. The display panel may include a first substrate and a second substrate that overlaps the first substrate. The light source may be attached to a first surface of the first substrate through the first light source pad and may be configured to receive a control signal transmitted through the first light source pad.

In one or more embodiments, the display device may further include a second light source pad. A first portion of the light source may be attached to the first surface of the first substrate through the first light source pad. A second portion of the light source may be attached to the first surface of the first substrate through the second light source pad.

In one or more embodiments, the light source may be configured to transmit a copy of the control signal to the second light source pad.

In one or more embodiments, the display device may further include a second light source. The display device may further include a third light source pad electrically connected to the second light source pad and configured to transmit the copy of the control signal to the second light source. The second light source may be attached to the first surface of the first substrate through the third light source pad.

In one or more embodiments, the display device may include a light source driver configured to generate a control signal. The display device may further include a wiring member electrically connected to the light source driver and configured to transmit the control signal toward the light source. A portion of the first substrate may be disposed between a first portion of the wiring member and a second portion of the wiring member.

In one or more embodiments, the portion of the first substrate may overlap the light source without overlapping the second substrate.

In one or more embodiments, the display device may include a connection member electrically connected between the wiring member and the light source driver. The first portion of the wiring member may be disposed on the first surface of the first substrate. The second portion of the wiring member may be disposed between the connection member and the portion of the first substrate.

In one or more embodiments, the display device may include a reflector that overlaps the light guide. The light source may be disposed between the reflector and the first light source pad.

One or more embodiments of the present invention may be related a display device in which a light source is attached to a display panel.

A display device according to one or more embodiments of the present invention may include the following elements: a display panel, a light source attached at one edge portion of the display panel, and a light guide positioned under the display panel according to a lying position of the display device.

The display panel may include a first substrate and a second substrate overlapping (or facing) each other. The light source may be attached to a lower surface of the first substrate according to the lying position of the display device.

The light source may face a surface of the light guide, and light emitted from the light source may be incident to the surface of the light guide.

A printed circuit board (PCB), a light source driver mounted on the PCB for generating a signal to drive the light source, and a connection film electrically connecting the PCB and the light source may be further included.

A first wiring member electrically connecting the light source driver and the connection film, and a second wiring member connecting the connection film and the light source may be further included.

The connection film may be attached to the upper surface of the PCB and may be attached to the upper surface of the first substrate. The first wiring member may be disposed at the upper surface of the PCB. The second wiring member may extend from the upper surface of the first substrate and the lower surface of the first substrate. In one or more embodiments, a portion of the second wiring member may overlap, may contact, and/or may be substantially parallel to a side surface of the first substrate. In one or more embodiments, the second wiring member may extend through a through hole of the first substrate.

The connection film may include at least one of a flexible printed circuit (FPC) structure and a chip-on-film (COF) structure.

The light source may include at least one of a light emitting diode (LED) chip and a light emitting diode (LED) package.

The display panel may include a display area and a non-display area, and the light source may be formed at the non-display area.

An optical sheet formed between the light guide and the display panel, and a reflector formed under the light guide may be further included.

According to one or more embodiments of the present invention, the light source is attached to the display panel such that a separate circuit board for supporting the light source may not be necessary. Advantageously, an assembly process in manufacturing a display device may be simplified, and the thickness of the display device may be minimized.

The light source driver and the light source electrically are connected through the connection film that also mechanically connects the printed circuit board (PCB) that carries the light source driver and the display panel. Advantageously, the structure of the display device may be substantially simplified.

DETAILED DESCRIPTION

Figure 1:
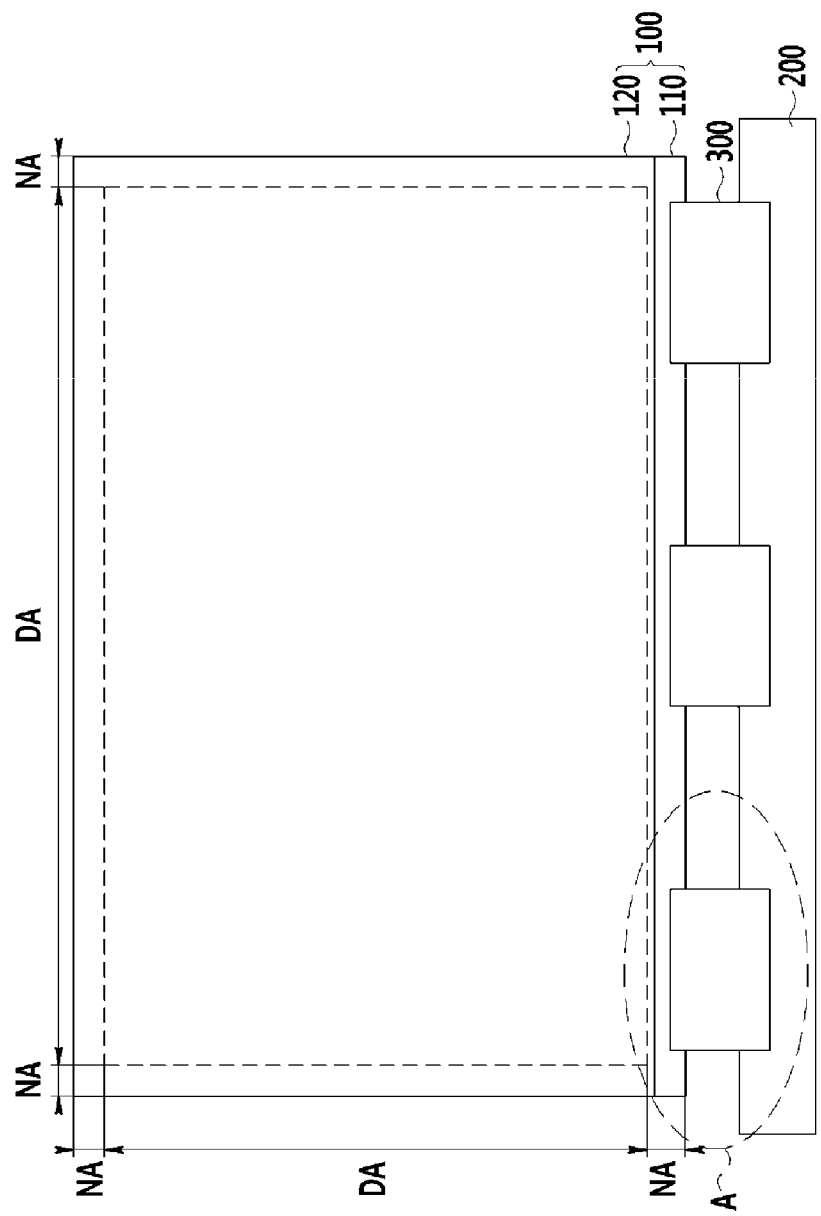
FIG. 1 is a top plan view illustrating an upper surface of a display device (or a front view of the display device according to a standing position of the display device) according to one or more embodiments of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention. In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present. In contrast, when an element is referred to as being "directly on" another element, the two elements directly contact each other, and there are no intervening elements (except possible environmental elements such as air) present between the two elements.

Although the terms first, second, third etc. may be used herein to describe various signals, elements, components, regions, layers, and/or sections, these signals, elements, components, regions, layers, and/or sections should not be limited by these terms. These terms may be used to distinguish one signal, element, component, region, layer, or section from another signal, region, layer or section. Thus, a first signal, element, component, region, layer, or section discussed below may be termed a second signal, element, component, region, layer, or section without departing from the teachings of the present invention. The description of an element as a "first" element may not require or imply the presence of a second element or other elements. The terms first, second, third etc. may also be used herein to differentiate different categories of elements. For conciseness, the terms first, second, third, etc. may represent first-category, second-category, third-category, etc., respectively.

Figure 2:
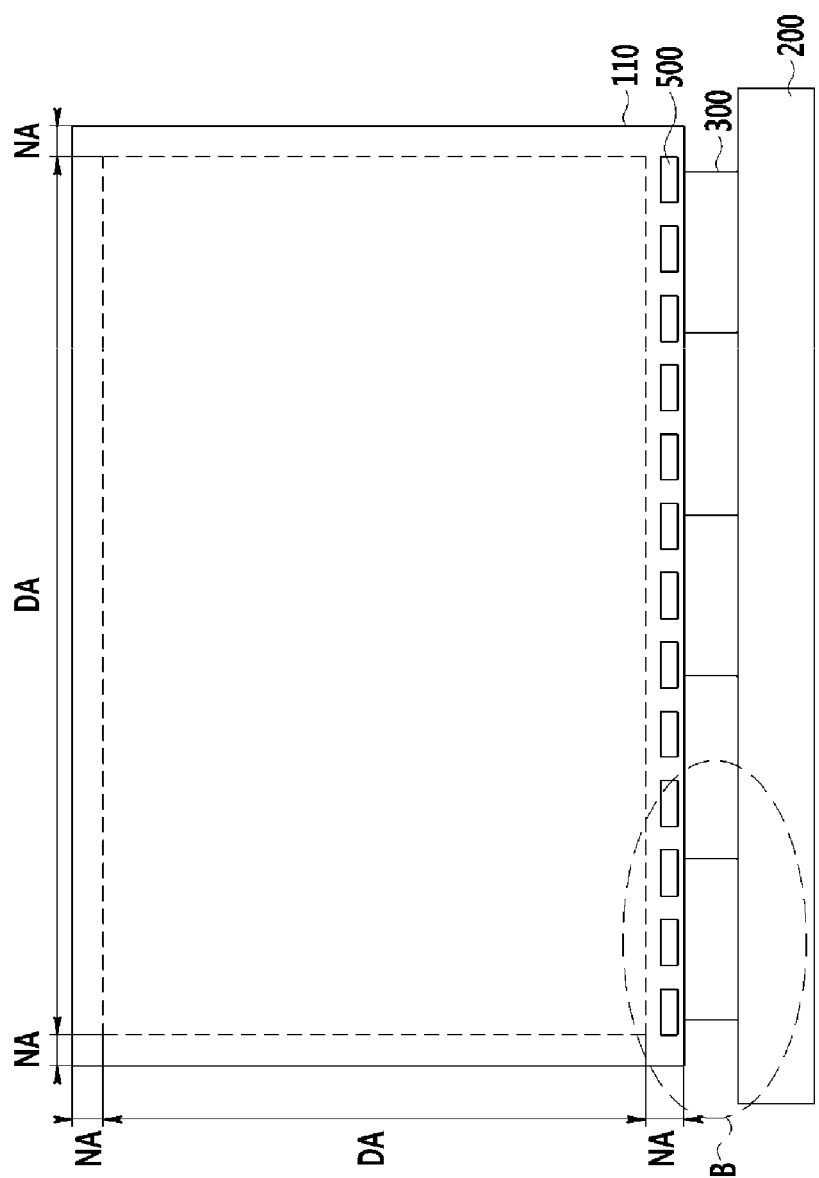
FIG. 2 is a top plan view illustrating a lower surface of a display device (or a rear view of the display device according to a standing position of the display device) according to one or more embodiments of the present invention.

FIG. 1 is a top plan view illustrating an upper surface of a display device (or a front view of the display device according to a standing position of the display device) according to one or more embodiments of the present invention, and FIG. 2 is a top plan view illustrating a lower surface of the display device (or a rear view of the display device according to the standing position of the display device) according to one or more embodiments of the present invention.

Firstly, referring to FIG. 1, the display device includes a display panel 100, a printed circuit board (PCB) 200 supporting a circuit that generates signals to drive the display panel 100, and a connection film 300 connecting the display panel 100 and the printed circuit board (PCB) 200.

The display panel 100 includes a first substrate 110, a second substrate 120 overlapping the first substrate 110, and a liquid crystal layer (not shown) disposed between the first substrate 110 and the second substrate 120.

Although not shown, the display panel 100 may include a plurality of gate lines, a plurality of data lines, and a plurality of thin film transistors that are formed on the first substrate 110. The display panel 100 may further include a pixel electrode that may be applied with a signal from a data line if a thin film transistor is turned on by a signal applied from a gate line. A common electrode may be formed on the first substrate 110 or the second substrate 120. An electric field may be formed between the pixel electrode and the common electrode to control alignment of liquid crystal molecules of the liquid crystal layer. Accordingly, the light incident to the display panel 100 may be controlled, and an image may be displayed on the display panel 100.

In one or more embodiments, the display panel 100 may be a liquid crystal display (LCD) panel. In one or more embodiments, and the display panel 100 may be one of various types of display panels, such as an electrophoretic display panel (EDP).

The display panel 100 may include (or may be divided into) a display area DA and a non-display area NA. The display area DA may be a region of the display panel 100 that is configured to displays images (according to orientations of liquid crystal molecules) and may be positioned substantially at the center of the display panel 100. The non-display area NA may be a region of the display panel 100 that is not configured to display images and may be covered by a light blocking member that encloses (or surrounds) the display area DA.

The first substrate 110 and the second substrate 120 may be formed with different sizes. For example, the first substrate 110 may be larger than the second substrate 120. The display device may include a portion where the first substrate 110 and the second substrate 120 overlap each other and a portion where only the first substrate 110 exists. The first substrate 110 exists at an edge of the display panel 100, and the second substrate 120 may not overlap this edge of the display panel 100. As illustrated in FIG. 1, according to a standing position of the display device, only the first substrate 110 exists at a lower edge of the display panel 100, and the second substrate 120 does not overlap the lower edge of the display panel 100.

A plurality of pad portions (including a gate pad portion and a data pad portion) connected to the gate lines and the data lines may be disposed at the lower edge of the first substrate 110 (or the edge of the first substrate 120 that does not overlap the second substrate 120).

The display device may further include a printed circuit board (PCB) 200, which may be manufactured by forming a copper thin film on an insulating plate and removing an unnecessary portion of the copper thin film according to a circuit diagram to form an electronic circuit. A plurality of components that includes circuits for generating signals configured to drive the display panel 100 may be mounted on the PCB 200. The components may include, for example, a gate driver, a data driver, and a timing controller.

The display device may further include a connection film 300 configured to electrically connect the PCB 200 and the display panel 100. The connection film 300 may transmit the signals generated at the PCB 200 to the gate lines and the data lines disposed at the display panel 100.

The connection film 300 may include a flexible printed circuit (FPC) and/or a chip-on-film (COF). The flexible printed circuit may include circuits formed on a flexible insulating film made of a heat resistant plastic material such as polyethylene terephthalate (PET) and/or a flexible material such as polyimide (PI). The chip-on-film may include a semiconductor chip mounted on a polyimide (PI) film, wherein a related circuit may be imprinted using an anisotropic conductivity film or a solder bump.

Next, referring to FIG. 2, the display device may further include a light source 500 attached to the display panel 100. For example, the light source 500 may include a light emitting diode (LED). In one or more embodiments, the display device may include a plurality of light source units (e.g., LEDs) attached to the display panel 100. The light source units may be disposed at a predetermined interval between each pair of the light source units.

The light source 500 may be attached to an edge of the display panel 100, for example, the lower edge of the first substrate 110 according to a standing position of the display device (or a portion of the first substrate 110 that does not overlap the second substrate 120. In one or more embodiments, the light source 500 may be positioned at the non-display area NA of the display panel 100. The light source 500 may not overlap the second substrate 120. The light source 500 and the second substrate 120 may be disposed at opposite sides with respect to the first substrate 110.

Figure 3:
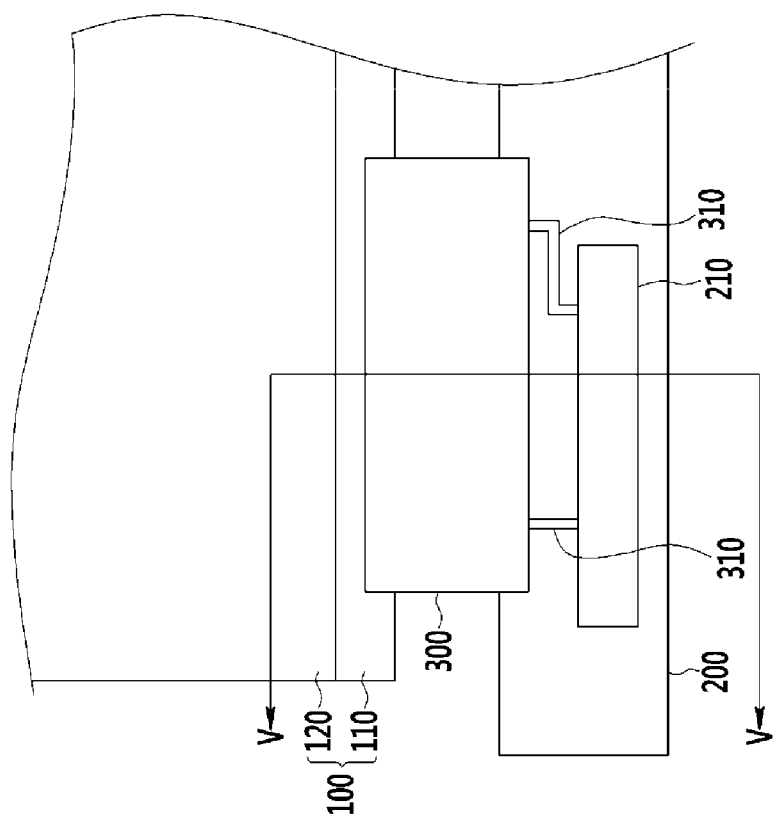
FIG. 3 is an enlarged top plan view illustrating a portion A indicated in FIG. 1 in a display device according to one or more embodiments of the present invention.
Figure 4:
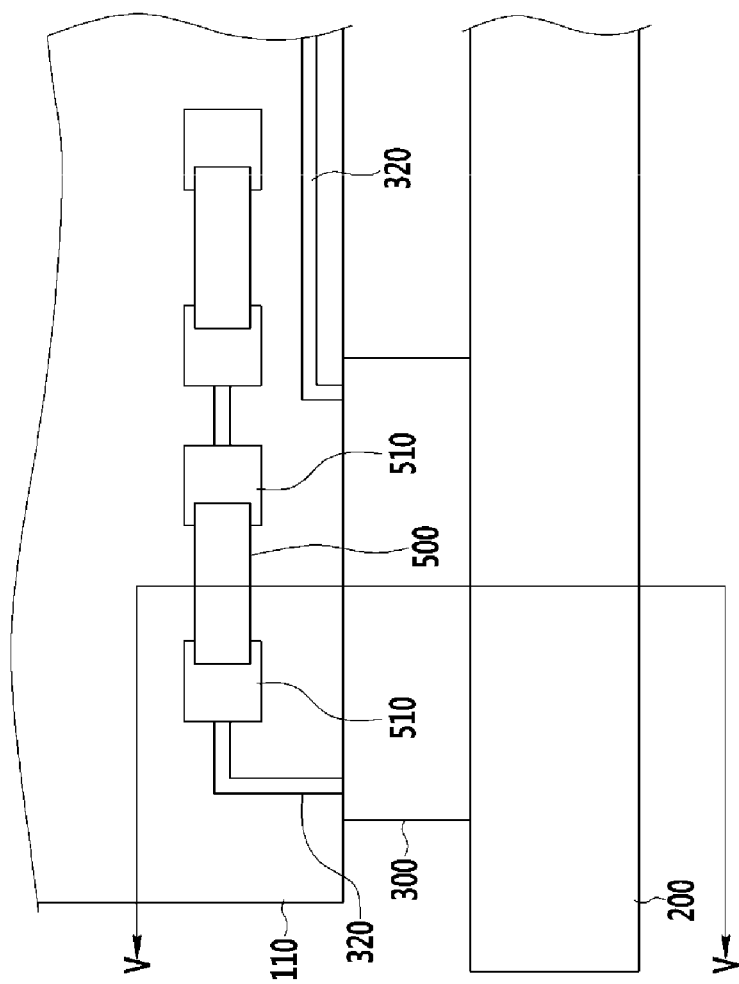
FIG. 4 is an enlarged top plan view illustrating a portion B indicated in FIG. 2 in a display device according to one or more embodiments of the present invention.
Figure 5:
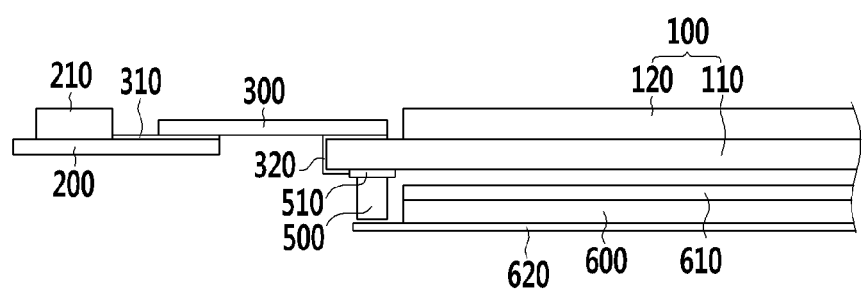
FIG. 5 is a cross-sectional view taken along the line V-V indicated in FIG. 3 and FIG. 4.

With reference to FIG. 3 to FIG. 5, a connection structure of the wiring member configured to apply signals to drive the light source 500 will be described.

FIG. 3 is an enlarged top plan view illustrating a portion A indicated in FIG. 1, FIG. 4 is an enlarged top plan view illustrating a portion B indicated in FIG. 2, and FIG. 5 is a cross-sectional view taken along the line V-V indicated in FIG. 3 and FIG. 4.

Referring to FIG. 3 and FIG. 5, a light source driver 210 for generating signals configured to drive the light source 500 is mounted on the printed circuit board (PCB) 200. The light source driver 210 may generate one or more of a signal configured for controlling the on/off of the light source 500, a signal configured for controlling brightness of the light source 500, and a signal configured for controlling dimming of the light source 500.

According to a lying position of the display device, a portion of the connection film 300 is attached to the upper surface of the printed circuit board (PCB) 200, and another portion of the connection film 300 is attached to the upper surface of the first substrate 110. A first wiring member 310 (electrically and mechanically) connecting the light source driver 210 and the connection film 300 is disposed on the printed circuit board (PCB) 200. The first wiring member 310, may transmit signals generated by the light source driver 210 (for controlling the light source 500) to the connection film 300. In one or more embodiments, the connection film 300 may be (electrically and/or mechanically) connected to the light source driver 210 through a plurality of wiring members.

Referring to FIG. 4 and FIG. 5, a light source pad portion 510 is disposed at an edge portion of the first substrate 110, for example, the lower edge portion of the first substrate 110 (according to a standing position of the display device) that does not overlap the second substrate 120. The light source pad portion 510 may be disposed at a lower surface of the first substrate 110 according to a lying position of the display device. The light source pad portion 510 may be disposed between the light source 500 and the first substrate 110. The light source 500 may be attached to the first substrate 110 through the light source pad portion 510.

Two light source pad portions 510 may be connected to two end portions of the light source 500.

A second wiring 320 configured for electrically connecting the light source 500 and the connection film 300 may be formed on the first substrate 110. An end portion of the second wiring 320 may be electrically connected to and may directly contact the light source pad portion 510, and the light source pad portion 510 may be electrically connected to and may directly contact the light source 500. According to a lying position of the display device, the second wiring member 320 may overlap and/or may directly contact each of the upper surface, the lower surface, and the side surface of the edge portion of the first substrate 110 that does not overlap the second substrate 120. According to the lying position of the display device, the connection film 300 is disposed at the upper surface of the first substrate 110, and the light source 500 is disposed at the lower surface of the first substrate 110. The second wiring member 320, which extends from the upper surface of the first substrate 100 to the lower surface of the first substrate 110, may electrically connect the connection film 300 and the light source pad portion 510, which is electrically connected to the light source 500.

In one or more embodiments, as illustrated in FIG. 5, the second wiring member 320 may contact the side surface of the edge portion of the first substrate 110 that does not overlap the second substrate 120. In one or more embodiments, a through hole may be positioned at the edge portion of the first substrate 110, and the second wiring member 320 may be disposed through the through hole to connect the connection film 300 and the light source pad portion 510.

Referring to FIG. 5, a light guide 600 is disposed under the display panel 100 according to a lying position of the display device. The light guide 600 may be configured for uniformly transmitting the light emitted from the light source 500 to at least a portion of the display panel 100 and may be made of an acryl injection material. The light source 500 may be disposed to face a surface of the light guide 600. For example, the light guide 600 may have a rectangular parallelepiped shape having four side surfaces connecting an upper surface and a lower surface, according to a lying position of the display device. The lower surface of the light guide 600 may overlap the upper surface of the light guide 600. At least one of the lower surface of the light guide 600 and the upper surface of the light guide 600 may be substantially parallel to the first substrate 110. The four side surfaces may include a first side surface, a second side surface, a third side surface, and a fourth side surface, one or more of which may be substantially perpendicular to the first substrate 110. The first side surface may be substantially parallel to the second side surface and may be positioned closer to the lower edge of the display panel 100 than the second side surface. An emission surface of the light source 500 may face the first side surface of the light guide 600 such that the light emitted from the light source 500 may be incident to the first side surface of the light guide 600. When the light incident to the first side surface of the light guide 600 moves upwardly to the second side surface of the light guide 600, a path of the light may be bent toward the display panel 100 such that at least a portion of the light is incident to the lower surface of the display panel 100 according to a lying position of the display device (or the rear/back surface of the display panel 100 according to a standing position of the display device). When a portion of the light is reflected by the second side surface of the light guide 600, the path of the reflected light may be bent toward the display panel 100 and may be incident to the lower surface of the display panel 100 according to the lying position of the display device (or the rear/back surface of the display panel 100 according to the standing position of the display device).

In one or more embodiments, as illustrated in FIG. 5, the light guide 600 has a constant thickness. In one or more embodiments, the thickness of the light guide 600 may be gradually decreased or increased from one side (e.g., the first side surface) to another side (e.g., the second side surface).

An optical sheet 610 may be disposed between the light guide 600 and the display panel 100. The optical sheet 610 may improve collecting efficiency of light emitted from the light guide 600 and may allow light to be uniformly distributed on the display panel 100. The optical sheet 610 may include a plurality of various sheets, which may include, for example, a diffuser sheet, a prism sheet, and a protecting sheet that are sequentially stacked.

The diffuser sheet may diffuse light emitted from the light source unit 500 and guided by the light guide 600. The prism sheet may collect light diffused by the diffuser sheet in a direction substantially perpendicular to a plane of the display panel 100. Most of the light passing through the prism sheet is substantially perpendicularly incident to the display panel 100. The protecting sheet may be disposed on the prism sheet and may protect the prism sheet against external impact.

In one or more embodiments, the optical sheet 610 may include one or more sheets additional to or alternative to one or more of the diffuser sheet, the prism sheet, and the protecting sheet. In one or more embodiments, the optical sheet 610 may not include one or more of the diffuser sheet, the prism sheet, and the protecting sheet.

A reflector 620 may be disposed under the light guide 600. The reflector 620 may orient a light path toward the display panel 100 and may prevent the light emitted from light source 500 from being emitted toward undesired directions. Accordingly, the light may be efficiently utilized, and energy may be conserved.

Figure 6:
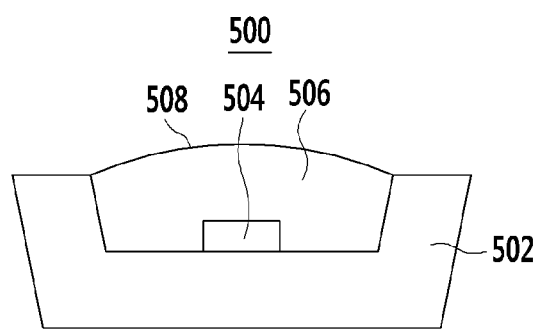
FIG. 6 is a cross-sectional view illustrating a light source used in a display device according to one or more embodiments of the present invention.

FIG. 6 is a cross-sectional view illustrating a light source used in a display device according to one or more embodiments of the present invention.

The light source 500 may represent a light emitting diode (LED) package. The light emitting diode (LED) package includes a main body 502, a light emitting diode (LED) chip 504 formed on the main body 502, and a passivation layer 508 formed on the main body 502 to enclose the light emitting diode (LED) chip 504.

The main body 502 may be formed of a shape in which an upper surface is depressed, and the light emitting diode (LED) chip 504 may be positioned in the depressed portion.

The light emitting diode (LED) chip 504 may be formed of one or more materials of which a wavelength is in range of a visible light region or near infrared region. The LED chip 504 may have high emission efficiency. The LED chip 504 may include a p-n junction. Example of the one or more materials may include compound semiconductors such as gallium nitride (GaN), gallium arsenide (GaAs), gallium phosphide (GaP), gallium-arsenide-phosphor (GaAs1-xPx), gallium-aluminum-arsenide (Ga1-xAlxAs), indium phosphide (InP), and indium-gallium-phosphor (In1-xGaxP). The light emitting diode (LED) chip may be a blue light emitting diode (LED) chip, a green light emitting diode (LED) chip, a red light emitting diode (LED) chip, or a white light emitting diode (LED) chip according to the wavelength.

The passivation layer 508 is configured for protecting the light emitting diode (LED) chip 504. The passivation layer 508 may entirely cover the depressed portion of the main body 502.

A phosphor element 506 may be disposed in the region enclosed by the passivation layer 508. The phosphor element 506 may be one or more of various colors, and the color of the light emitted from the light emitting diode (LED) package is determined according to the color of the phosphor element 506. For example, if the light emitting diode (LED) chip 504 is a blue light emitting diode (LED) chip for emitting blue light and if the phosphor element 506 has a red color, red light may be emitted by the light emitting diode (LED) package.

The light emitting diode (LED) package including the main body 502, the light emitting diode (LED) chip 504, and the passivation layer 508 may be attached to the display panel 100 as the light source 500.

In one or more embodiments, the light emitting diode (LED) chip 504 (without the main body, the passivation layer 508, or the phosphor 506) may be used as the light source 500 and may be attached to the display panel 100.

In one or more embodiments, as illustrated in FIG. 2, the light source 500 of the display device may be attached to the lower edge portion of the display panel 100 according to a standing position of the display device. In one or more embodiments, the light source 500 and/or one or more other light sources may be additionally or alternatively attached to one or more of the upper edge portion, the right edge portion, and the left edge portion of the display panel 100. While this invention has been described in connection with what is presently considered to be practical embodiments, it is to be understood that the invention is not limited to the disclosed embodiments. The invention is intended to cover various modifications and equivalent arrangements included within the spirit and scope of the appended claims.

<Description of Symbols>

| | |
|---|---|
| 100: display panel | 110: first substrate |
| 120: second substrate | 200: printed circuit board (PCB) |
| 210: light source driver | 300: connection film |
| 310: first wiring member | 320: second wiring member |
| 500: light source | 502: main body |
| 504: light emitting diode (LED) chip | 506: phosphor element |
| 508: passivation layer | 510: light source pad portion |
| 600: light guide | 610: optical sheet |
| 620: reflector | |

What is claimed is:

1. A display device comprising:
 a display panel;
 a light source overlapping the display panel and attached to a surface of the display panel;
 a printed circuit board spaced from the display panel;
 a light source driver disposed on the printed circuit board and configured for generating a signal to control the light source; and
 a light guide overlapping the display panel.

2. The display device of claim 1, wherein the display panel includes
 a first substrate and a second substrate overlapping each other, and
 wherein the light source is attached to a first surface of the first substrate, the first surface of the first substrate being substantially parallel to a first surface of the light guide.

3. The display device of claim 2, wherein the light source faces a second surface of the light guide, the second surface of the light guide being not parallel to the first surface of the first substrate, and
 wherein the light source is configured to irradiate light on the second surface of the light guide.

4. The display device of claim 1, further comprising:
 a connection film connecting the printed circuit board and the display panel.

5. The display device of claim 4, further comprising:
 a first wiring member connecting the light source driver and the connection film; and
 a second wiring member connecting the connection film and the light source.

6. The display device of claim 5, wherein
 a first portion of the connection film is attached to the printed circuit board through the first wiring member,
 a second portion of the connection film is attached to a second surface of the first substrate through the second wiring member, and
 a portion of the first substrate is disposed between a first portion of the second wiring member and a second portion of the second wiring member.

7. The display device of claim 4, wherein
 the connection film includes at least one of a flexible printed circuit structure and a chip-on-film structure.

8. The display device of claim 1, wherein
 the light source includes at least one of a light emitting diode chip and a light emitting diode package.

9. The display device of claim 1, wherein the display panel includes a display area and a non-display area, and
 wherein the light source is disposed at the non-display area.

10. The display device of claim 1, further comprising:
 an optical sheet disposed between the light guide and the display panel; and
 a reflector,
 wherein the light guide is disposed between the optical sheet and the reflector.

11. The display device of claim 10, wherein the light source is disposed between the reflector and the display panel.

12. The display device of claim 10, wherein a portion of the reflector extends beyond the light guide, and wherein the light source is disposed between the display panel and the portion of the reflector.

13. The display device of claim 1, further comprising a first light source pad,
 wherein the display panel includes a first substrate and a second substrate that overlaps the first substrate, and
 wherein the light source is attached to a first surface of the first substrate through the first light source pad and is configured to receive a control signal transmitted through the first light source pad.

14. The display device of claim 13, further comprising a second light source pad,
- wherein a first portion of the light source is attached to the first surface of the first substrate through the first light source pad, and
- wherein a second portion of the light source is attached to the first surface of the first substrate through the second light source pad.

15. The display device of claim 14, wherein the light source is configured to transmit a copy of the control signal to the second light source pad.

16. The display device of claim 15, further comprising:
- a second light source; and
- a third light source pad electrically connected to the second light source pad and configured to transmit the copy of the control signal to the second light source,
- wherein the second light source is attached to the first surface of the first substrate through the third light source pad.

17. The display device of claim 13, further comprising:
- a wiring member electrically connected to the light source driver and configured to transmit the control signal toward the light source,
- wherein a portion of the first substrate is disposed between a first portion of the wiring member and a second portion of the wiring member.

18. The display device of claim 17, wherein the portion of the first substrate overlaps the light source without overlapping the second substrate.

19. The display device of claim 17, further comprising a connection member electrically connected between the wiring member and the light source driver, wherein the first portion of the wiring member is disposed on the first surface of the first substrate, and wherein the second portion of the wiring member is disposed between the connection member and the portion of the first substrate.

20. The display device of claim 13, further comprising a reflector overlapping the light guide, wherein the light source is disposed between the reflector and the first light source pad.

* * * * *